Figure 5:
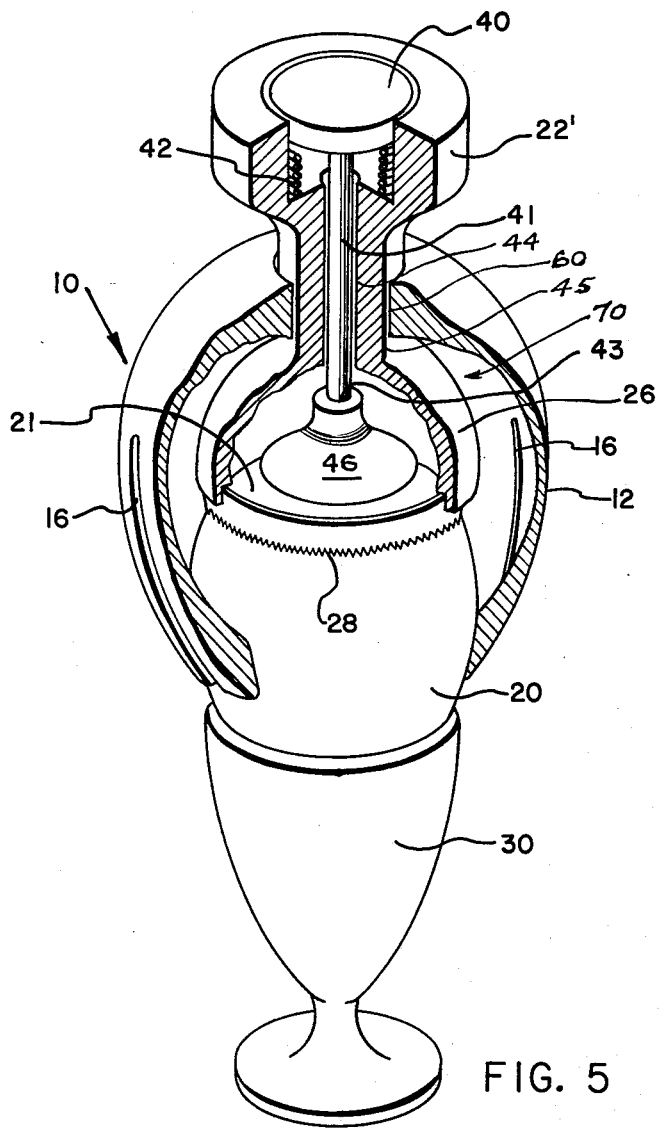

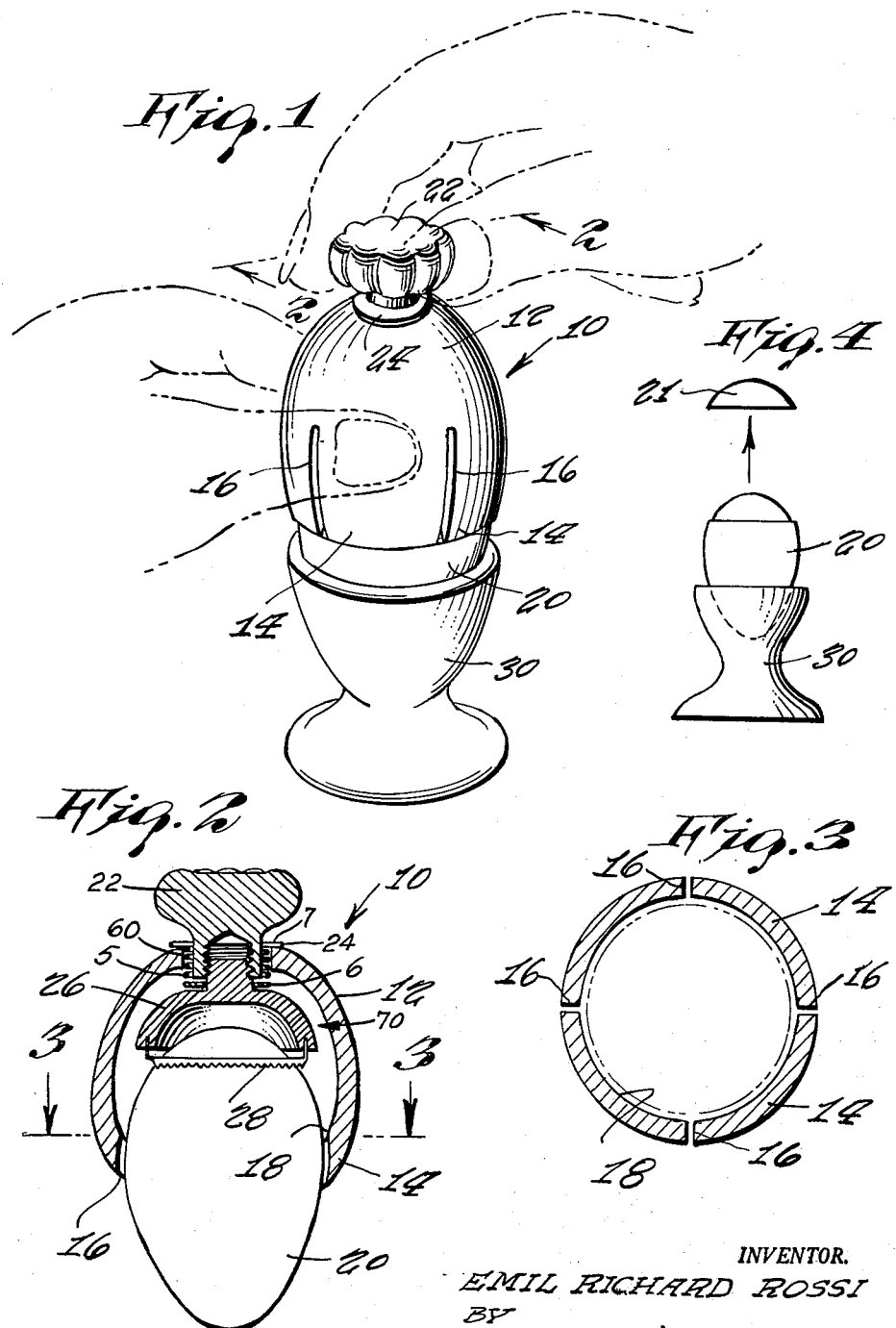

INVENTOR.
EMIL RICHARD ROSSI
ATTORNEY sides # United States Patent Office 3,090,413
Patented May 21, 1963

3,090,413
EGG TOP REMOVER
Emil Richard Rossi, 801 Bachelor Ave., Linden, N.J.
Filed Jan. 11, 1962, Ser. No. 172,363
1 Claim. (Cl. 146—2)

This invention relates to a device for cutting into the shell of an egg and removing a section thereof to enable insertion of a spoon therein for eating said egg. More specifically, it deals with a flexible hood to be slipped and held over the top of the egg, and a circular cutter mounted therein and designed to be rotated for effecting the cutting action, as well as suction means for holding the cut shell while it is being removed from the egg.

Although the introduction of egg cups has simplified the holding of a boiled egg while it is being eaten, there has been remaining the time-consuming and difficult task of breaking the exposed top of the egg and picking off the broken pieces of shell so as to exposed the edible portion. According to the present invention, the top of the shell is easily removed in a matter of seconds from eggs of different sizes.

The invention will be more readily understood by reference to the accompanying drawings in which a preferred embodiment is described, and in which FIGURE 1 presents a perspective side view of an egg shell section remover made in accordance with the present invention and in actual use on an egg disposed in an egg cup. A longitudinal cross-sectional elevation, taken along line 2—2 of FIGURE 1, is depicted in FIGURE 2. FIGURE 3 illustrates a transverse cross-sectional view taken along line 3—3 of FIGURE 2. A side-elevational view of an egg in an egg cup, with an egg shell section removed (as by the device of the present invention) is shown in FIGURE 4. A vertical cross-sectional view of a preferred embodiment of the present invention, and a modification of the device depicted in FIGURES 1–4, and having a centrally-disposed suction cup for holding the cut shell section, is illustrated in FIGURE 5. Similar numerals refer to similar parts in the various figures.

Referring again to the drawing, numeral 10 designates generally an egg shell section remover of the present invention, which includes a round hollow hood receptacle into which the upper end of egg 20 is fitted. In order to accommodate eggs of different sizes, the lower portion of hood 12 is provided with a plurality of circumferentially-spaced longitudinally-extending slots 16 which define individual fin segments 14 designed to flex conveniently inwardly and outwardly to slip over the periphery of an egg, which may be of variable size. Once hood 12 is slipped over the side of the egg, one hand may be used to press fins 14 so as to maintain it stationary while the other hand is performing the cutting operation hereinafter to be described.

The upper portion of hood 12 is provided with an opening 60 into which is inserted the hand-operated cutting unit generally indicated as 70. Spring type bushing 24, fastened to the lower portion of handle 22 which is fastened on to cap 26 (FIGS. 1–2), is disposed in opening 60 and it yieldably and rotatably supports handle 22 having depending cap 26 rotatably mounted within the interior of hood 12. Bushing 24 includes a washer 6 which limits axial movement of handle 22 and a shoulder 7 serving as the thrust element (with washer 6) for spring 5. Secured to the bottom periphery of cap 26 is downwardly-directed annular serrated cutting blade 28, preferably made of high tempered steel and provided with fine teeth for cutting (by rotation thereof) the uppermost section 21 of egg 20 inserted in cap 30.

From the foregoing, it is apparent that when egg 20 is placed in cup 30, and remover 10 is slid over the egg and held in place by light pressure on fins 14 with one hand, a pressurized rotating action by the other hand on handle 22 causes blade 28 to cut a circle in the upper end of egg 20 (FIG. 4), thereby greatly facilitating removal of severed section 21 of the shell. It will be further noted that the radially inwardly-curved ends 18 of fins 14 serve as an effective clamp for securing the egg against rotation when handle 22 is turned.

In the preferred embodiment shown in FIGURE 5 (which is a modification of the device depicted in FIGURES 1–4), knob or handle 22' is provided with a hollow cavity in which is mounted push button 40 which is kept in elevated position by helical spring 42. Attached to push button 40 is downwardly-directed rod 41 riding vertically in hole 44 centrally-disposed in shaft 45 connecting knob 22' with cutting cap 26. Attached to the bottom of rod 41 is a suction cup 46 made of rubber or similar material and located and designed in a manner such that when spring-loaded button 40 is pushed down, suction cup 46 is pushed against egg section 21 by rod 41 so as to expel at least some of the air in suction cup 46. Upon release of pressure on button 40, suction cup 46 obtains a good grip on egg shell section 21. Thus, when knob 22' is turned to cut off egg section 21 by serrated cutter 28, and section 21 is cut off thereby, lifting of the entire remover 10 will also remove with it cut section 21 adherring, by vacuum, to suction cup 46. It is desirable, in the case of remover of FIGURE 5, to make the dimensions such that when press button 40 is at its upper rest position, the top portion of suction cup 46 will rest against the inner wall of cup 26.

This application is a continuation-in-part of copending application Serial No. 61,765, filed on October 10, 1960, now abandoned, by Emil Richard Rossi.

I claim:
An egg shell top section remover, comprising
 a hollow hood having a centrally-disposed hole in its upper portion and having a slotted flexible lower wall and a downwardly-directed opening for accommodating an egg inserted therein,
 a hollow knob disposed over said hood and having a narrower portion protruding downwardly through the hole in said hood,
 a cap fitting onto said narrower knob portion and coaxially within said hood and disposed over an egg placed in said hood,
 a circular cutter supported on said cap and coaxially within said hood in cutting position over the upper portion of an egg, in a manner such that when said knob is pressed and rotated, said cutter will cut a round section out of an egg shell of an egg disposed thereunder,
 a push button disposed within the top of the hollow in said knob,
 a rod attached to said button and protruding downwardly through said hollow, and
 a suction cup attached to the lower end of said rod in a manner such that when said button is pressed, said suction cup will grip the upper section of an egg shell to be cut off.

References Cited in the file of this patent
UNITED STATES PATENTS

| 2,436,469 | De Luce | Feb. 24, 1948 |
| 2,798,521 | Bourgue | July 9, 1957 |

FOREIGN PATENTS

| 1,576 | Great Britain | 1869 |
| 532,990 | Germany | Sept. 12, 1931 |
| 747,130 | France | Mar. 21, 1933 |